United States Patent
Goetz et al.

(10) Patent No.: US 11,769,153 B1
(45) Date of Patent: *Sep. 26, 2023

(54) AUTHENTICATION AT ATM AND HANDSHAKE BETWEEN CUSTOMER AND DRIVER

(71) Applicant: Wells Fargo Bank, N.A., San Francisco, CA (US)

(72) Inventors: Darren M. Goetz, Salinas, CA (US); Ashish B. Kurani, Hillsborough, CA (US); JoAnn Mar, San Francisco, CA (US); Dennis Montenegro, Concord, CA (US); Joseph Ng, San Mateo, CA (US); Damodar Raval, San Francisco, CA (US); Lisa Schur, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,920

(22) Filed: May 23, 2022

Related U.S. Application Data

(63) Continuation of application No. 16/660,642, filed on Oct. 22, 2019, now Pat. No. 11,341,499.

(51) Int. Cl.
  *G06Q 20/40* (2012.01)
  *G06Q 20/10* (2012.01)

(52) U.S. Cl.
  CPC ... *G06Q 20/40145* (2013.01); *G06Q 20/1085* (2013.01)

(58) Field of Classification Search
  CPC .................. G06Q 20/40145; G06Q 20/1085
  See application file for complete search history.

(56) References Cited

U.S. PATENT DOCUMENTS

| 6,386,323 B1 | 5/2002 | Ramachandran et al. |
| 7,900,820 B1 | 3/2011 | Chan |

(Continued)

FOREIGN PATENT DOCUMENTS

| JP | 2002-096912 A | 4/2002 |
| JP | 2002096912 A * | 4/2002 |

(Continued)

OTHER PUBLICATIONS

"India Posts services win public applause", https://www.thehansindia.com/telanaana/india-posts-Services-win-public-applause-512057 Hans New Service, Mar. 14, 2019. 5 pages.

(Continued)

*Primary Examiner* — Bruce I Ebersman
*Assistant Examiner* — Matthew Cobb
(74) *Attorney, Agent, or Firm* — Foley & Lardner LLP

(57) ABSTRACT

Systems, methods, and apparatuses described herein relate to a method for providing authentication with respect to a cash delivery request made by a customer using a customer user device of the customer. The method includes receiving at least one of security information or a first cash authentication code (CAC) from a cash dispenser machine. The cash dispenser machine obtains the security information or the first CAC from a first user device of a driver or the driver. The method includes authenticating the driver based on at least one of the security information or the first CAC. The method includes generating a second CAC. The method includes transmitting the second CAC to the first user device of the driver. The method includes authenticating the driver and the customer based on at least one of the security information or the second CAC.

18 Claims, 8 Drawing Sheets

(56) References Cited

U.S. PATENT DOCUMENTS

| | | | |
|---|---|---|---|
| 10,275,972 B2 | 4/2019 | Cantley et al. | |
| 2003/0069843 A1 | 4/2003 | Kidd | |
| 2003/0229548 A1 | 12/2003 | Kakuta | |
| 2004/0230537 A1 | 11/2004 | Kamonji et al. | |
| 2007/0033138 A1 | 2/2007 | Obadan | |
| 2012/0041675 A1 | 2/2012 | Juliver et al. | |
| 2016/0012411 A1 | 1/2016 | Kursun et al. | |
| 2018/0096323 A1 | 4/2018 | Baber et al. | |
| 2018/0114216 A1 | 4/2018 | Joseph et al. | |
| 2019/0122220 A1 | 4/2019 | Phillips et al. | |
| 2019/0147673 A1 | 5/2019 | Rephlo | |
| 2019/0172050 A1* | 6/2019 | Winters | G06Q 20/3255 |
| 2019/0333016 A1* | 10/2019 | Phillips | G06K 19/06037 |
| 2020/0005289 A1 | 1/2020 | Hudson et al. | |

FOREIGN PATENT DOCUMENTS

| | | | |
|---|---|---|---|
| JP | 2019-852444 A | | 11/2017 |
| JP | 2020-067837 A | | 4/2020 |
| JP | 2020067837 A | * | 4/2020 |

OTHER PUBLICATIONS

Swati Shinde Gole, "Soon, micro ATM to deliver cash at doorstep", https://timesofindia.indiatimes.com/city/pune/Soon-micro-ATM-to-deliver-cash-at-doorstep/articleshow/53257078.cms Jul. 18, 2016. 2 pages.

\* cited by examiner

AUTHENTICATION AT ATM AND HANDSHAKE BETWEEN CUSTOMER AND DRIVER

CROSS-REFERENCE TO RELATED APPLICATIONS AND CLAIM OF PRIORITY

This application is a continuation of U.S. patent application Ser. No. 16/660,642, entitled "Authentication at ATM and Handshake Between Customer and Driver," filed Oct. 22, 2019, all of which is incorporated herein by reference in its entirety and for all purposes.

BACKGROUND

Traditionally, an authentication process at an ATM is completed by a customer operating the ATM while at the location of the ATM. The ATM may have authentication features to verify the customer trying to retrieve cash. However, the ability to authenticate a user who is not the customer and who is retrieving cash on behalf of the customer is lacking. Having a user withdraw cash at an ATM from a different user's customer account increases the risk of fraudulent activity and the risk of compromising financial data of the customer.

SUMMARY

In various arrangements, a method for providing authentication with respect to a cash delivery request made by a customer using a customer user device of the customer. The method includes receiving, by a provider computing system, at least one of security information or a first cash authentication code (CAC) from a cash dispenser machine. The cash dispenser machine obtains the security information or the first CAC from a first user device of a driver or the driver. The method further includes authenticating, by the provider computing system, the driver based on at least one of the security information or the first CAC. The method includes generating, by the provider computing system, a second CAC. The method further includes transmitting, by the provider computing system, the second CAC to the first user device of the driver. The method includes authenticating, by the provider computing system, the driver and the customer based on at least one of the security information or the second CAC.

In various arrangements, a provider computing system for providing authentication with respect to a cash delivery request made by a customer operating a user device of the customer includes a processing circuit comprising a processor and a memory. The processing circuit is configured to receive at least one of security information or a first cash authentication code (CAC) from a cash dispenser machine, authenticate a driver based on at least one of the security information or the first CAC, generate a second CAC, transmit the second CAC to a first user device of a driver, and authenticate the driver and the customer based on at least one of the security information or the second CAC.

In various arrangements, a non-transitory computer-readable medium includes computer-readable instructions such that, when executed by a processor, causes the processor to receive security information or a first CAC from a cash dispenser machine. The cash dispenser machine may obtain the security information or the first CAC from a first user device of a driver or the driver. The processor may also authenticate the driver based on at least one of the security information or the first CAC, generate a second CAC, transmit the second CAC to the first user device of the driver, and authenticate, based on the security information or the second CAC, the driver and a customer who made a cash delivery request using a second user device of the customer.

These and other features, together with the organization and manner of operation thereof, will become apparent from the following detailed description when taken in conjunction with the accompanying drawings.

DETAILED DESCRIPTION

Figure 1A:
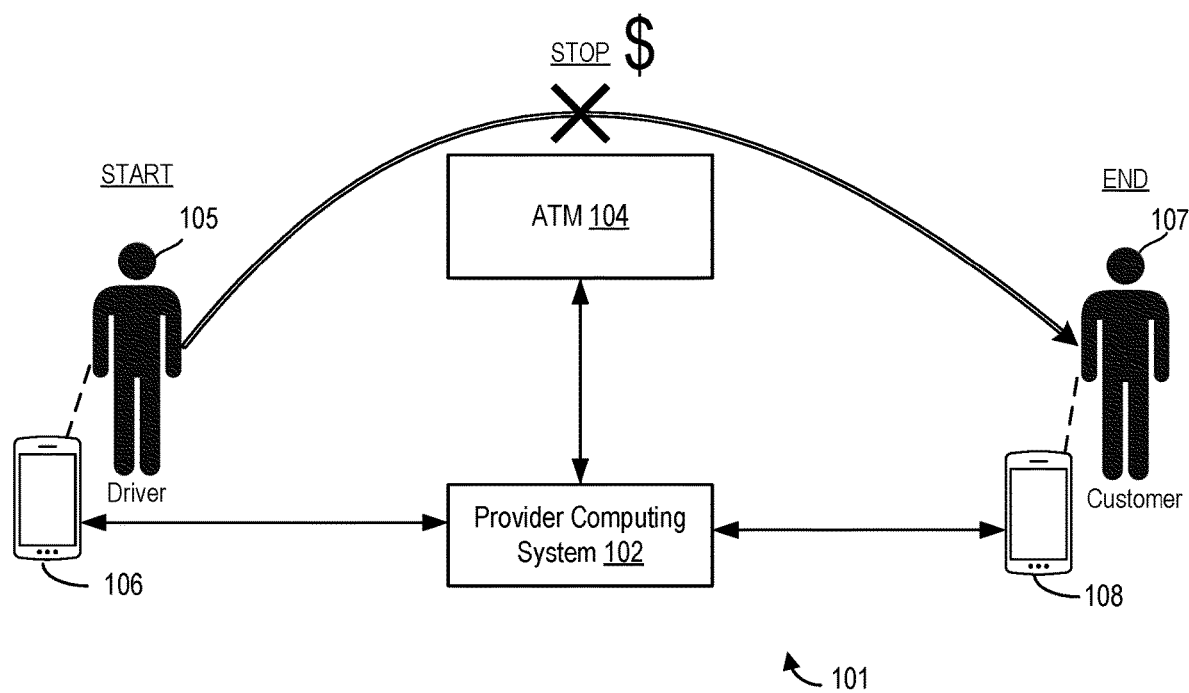
FIGS. 1A and 1B are block diagrams illustrating a system for generating and communicating a cash delivery request between user devices, an Automated Teller Machine (ATM) and a provider computing system, according to various arrangements.

Referring generally to the FIGS., arrangements described herein relate to various systems, apparatuses, methods, and non-transitory computer-readable media for providing a two-way authentication process with respect to a cash delivery request made via an online cash delivery application. In some arrangements, a customer of a provider institution, such as a financial institution, requests an amount of cash using a mobile application on a user device of the customer. Further details regarding the cash delivery application are disclosed in U.S. patent application Ser. No. 16/660,631, titled "CASH DELIVERY APPLICATION," filed on Oct. 22, 2019, which is incorporated by reference herein in its entirety. To increase security of the cash delivery request made by the customer, a two-way authentication process may be performed by the backend of the provider institution via a provider computing system. Using the cash delivery application, automatic authentication can first be facilitated between a user device of the delivery person (e.g., a driver) and a cash dispenser machine (e.g., an ATM). Automatic or semi-automatic authentication can then also be facilitated between the user device (e.g., a driver user device) of the delivery person and a user device of the customer in a second authentication stage. In some arrangements, a cash authentication code (CAC) is generated by the provider computing system and sent to a driver user device operated by the driver delivering the cash delivery request to the customer. In other arrangements, security information saved by the provider computing system when the driver registers for the delivery service is used to authenticate the correct driver user device at a cash dispenser machine and at the "handshake" between the customer and the driver when the cash is exchanged. In some arrangements, the same CAC is used for authentication at both the exchange at the cash dispenser machine and at the exchange between the customer and the driver. In other examples, authenticating the driver by scanning a CAC via a driver user device automatically causes a new CAC to be generated by the provider computing system and transmitted to the customer user device and/or the driver user device.

The systems and methods described herein overcome the risks of security fraud that increase when someone other than the customer withdraws cash from the customer account at an ATM. Conventionally, an ATM has authentication protocols that allow the ATM to verify the customer withdrawing cash from the customer account once the customer is at the ATM. However, in certain situations, such as emergencies, a customer may not have the opportunity to go to an ATM to withdraw cash themselves. In these circumstances, the customer may need the cash withdrawn from his or her account for them and delivered to his or her current location, but may not want to risk the chance of fraudulent activity for a bank account with the provider institution. For example, the customer may be concerned that the other user retrieving the cash on the customer's behalf accesses personal and/or financial information of the customer to access funds later. In other examples, the customer may worry that the other user may withdraw the wrong amount of cash requested or that a user other than the delivery person for the cash delivery request retrieves the cash from the ATM and never delivers it to the customer. To address such concerns, the system described herein can provide a two-way authentication process for the delivery route to the customer. The first authentication stage is at the exchange between the ATM and the delivery person (e.g., a driver) retrieving the cash on behalf of the customer and the second authentication stage is at the exchange between the delivery person and the customer when the cash is given to the customer. Additionally, the user devices of the driver and the customer can be continuously tracked using Global Positioning System (GPS) data in order to further verify the transaction at both authentication stages and prevent illicit behavior during the delivery of the cash to the customer.

Referring to FIG. 1A, a block diagram of a cash delivery request system 101 is shown, according to some arrangements. The system 101 is shown to include at least a provider computing system 102, an ATM 104, a driver user device 106, and a customer user device 108. The driver user device 106 is used by a driver 105, and the customer user device is used by the customer 107. As referred to herein, the location of the driver 105 corresponds to the location of the driver user device 106 as determined from location data (e.g., GPS data) provided by the driver user device 106, where the driver 105 is assumed to be carrying and operating the driver user device 106. Similarly, the location of the customer 107 corresponds to the location of the customer user device 108 as calculated from location data provided by the customer user device 108. In an example arrangement, the provider computing system is communicably connected to the ATM 104, the driver user device 106, and the customer user device 108 via a network 172. The customer 107, via the customer user device 108, makes a request for cash to be delivered to the location of the customer user device 108. The provider computing system 102 can process the cash delivery request and send a notification to the driver user device 106, the notification including the request from the customer user device 108 and the route the driver 105 can take to the ATM 104 to retrieve the cash and to the location of the customer 107. In some arrangements, the provider computing system 102 broadcasts the cash delivery request to a network of driver user devices such as but not limited to, the driver user device 106. For simplification, only the single driver 105 and the driver user device 106 are shown in FIG. 1A. If the driver 105 accepts the processed cash delivery request from the provider computing system 102, a CAC can be sent to the driver user device 106 to use as verification at ATM 104 when the driver 105 arrives at the ATM 104 (e.g., when the location of the driver user device 106 is determined to be at the location of the ATM 104). In some arrangements, the CAC is a barcode, a QR code, a one-time access code, a virtual card, a near-field communication signal (e.g., a NFC signal), or so on, as will be described in greater detail below. After the identification of the driver 105 is authenticated and the driver 105 finishes withdrawing the cash at the ATM 104, the driver 105 proceeds to the location of the customer user device 108 to deliver the cash. In various arrangements, the same CAC, or a new CAC, is used to verify the correct customer 107 who made the cash delivery request and verify the correct driver 105 delivering the cash.

Figure 1B:
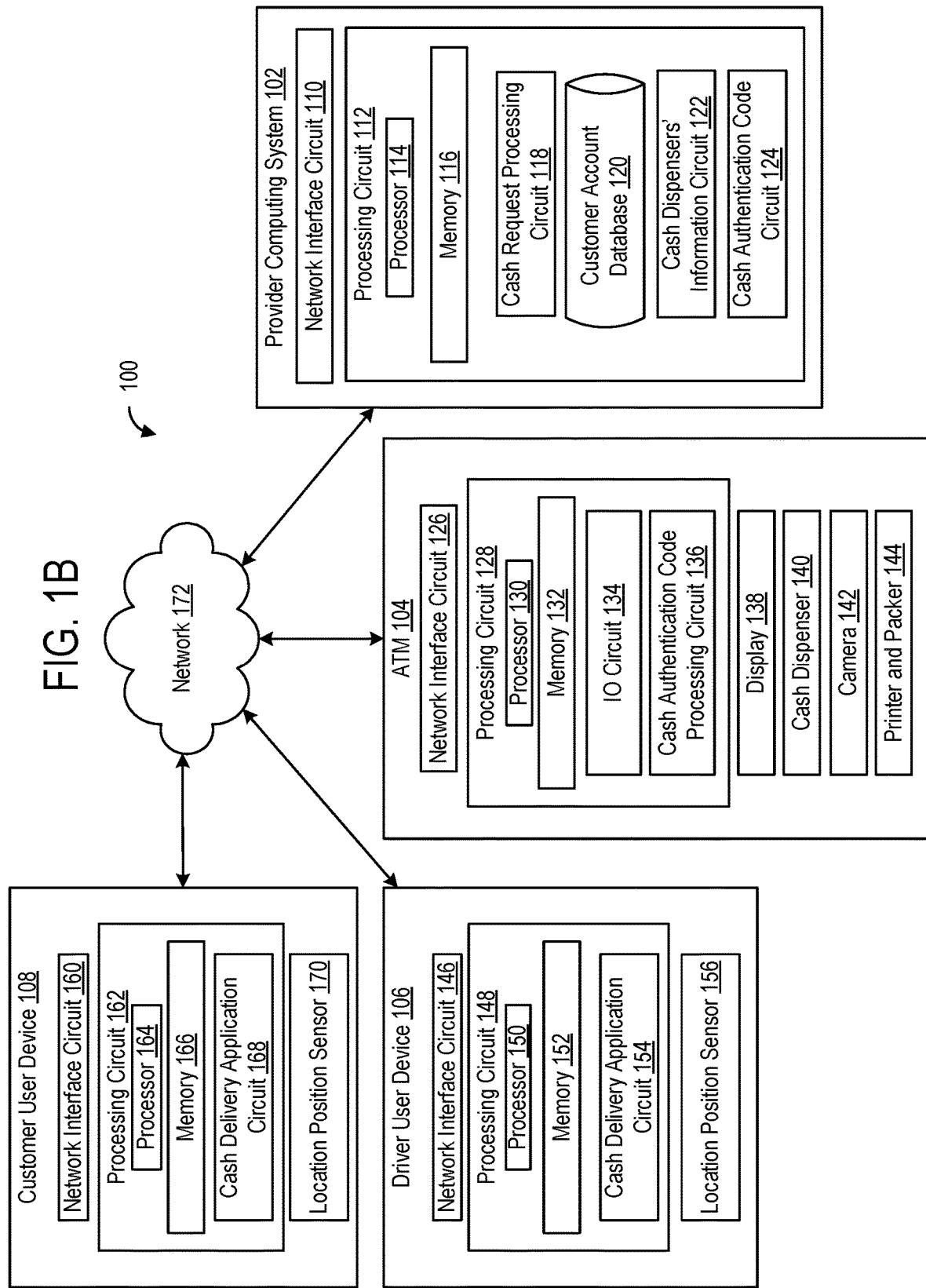

Referring to FIG. 1B, a block diagram of a cash delivery request system 100 is shown, according to an example arrangement. As described in further detail below, the system 100 facilitates the generation, acceptance, and authentication of a request for cash from a customer of the provider institution. As shown, the system 100 includes a provider computing system 102 communicably and operatively coupled with the ATM 104, the driver user device 106, and the customer user device 108 over a network 172. The network 172 provides communicable and operative coupling between the provider computing system 102, the ATM 104, the driver user device 106, the customer user device 108, and other components disclosed and described herein to provide and facilitate the exchange of communications (e.g., data, instructions, messages, values, commands). Accordingly, the network 172 may include any network including wired (e.g., Ethernet) and/or wireless networks (e.g., 802.11X, ZigBee, Bluetooth, WiFi). In some arrangements, the network 172 includes the Internet. In other arrangements, the network 172 includes a proprietary banking network to provide secure or substantially secure communications between provider computing system 102, ATM 104, driver user device 106, and customer user device 108.

The provider computing system 102 is operated by a provider, which is an entity that facilitates various types of transactions between the ATM 104, driver user device 106, customer user device 108, and various other entities not explicitly described or shown herein. The provider institution may be a bank, credit union, a payment services company, or other similar entities. The provider computing system 102 includes, among other systems, a network interface circuit 110 enabling the provider computing system 102 to exchange data over network 172 and a processing circuit 112.

The network interface circuit 110 includes program logic that facilitates connection of the provider computing system 102 to the network 172. The network interface circuit 110 supports communication between the provider computing system 102 and other systems, such as the ATM 104, the driver user device 106, and the customer user device 108. For example, the network interface circuit 110 includes an Internet modem, a cellular modem, a Bluetooth transceiver, a Bluetooth beacon, and so on. In some arrangements, the network interface circuit 110 communicates via a secure wired connection within a branch of a provider (e.g., a financial institution) associated with the provider computing system 102. In some arrangements, the network interface circuit 110 includes the hardware and machine-readable media sufficient to support communication over multiple channels of data communication. Further, in some arrangements, the network interface circuit 110 includes cryptography capabilities to establish a secure or relatively secure communication session with the provider computing system 102, ATM 104, driver user device 106, and customer user device 108. In this regard, financial data (and/or other types of data) may be encrypted and transmitted to prevent or substantially prevent the possibility of hacking system 100 to access the financial data of the provider institution associated with the provider computing system 102.

The processing circuit 112 includes a processor 114 and memory 116. The processor 114 may be implemented as one or more application specific integrated circuits (ASICs), field programmable gate arrays (FPGAs), a group of processing components, or other suitable electronic processing components. Memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein.

The provider computing system 102 includes a cash request processing circuit 118 configured to manage, generate, transmit, and evaluate requests for cash from the cash delivery application. Accordingly, the cash request processing circuit 118 is communicatively coupled to the ATM 104, the driver user device 106, and the customer user device 108. The cash request processing circuit 118 can be configured to receive a request to generate a cash delivery associated with an amount of cash to withdraw from a cash dispenser machine (e.g., ATM 104) and transmit the cash delivery request to drivers via user devices of the drivers (e.g., driver user device 106). While ATM 104 is described as an example of a cash dispenser machine, other cash dispenser machines may include cash lockboxes, a point-of-sale (POS) device, or any other machine associated with the provider institution that dispenses cash. For example, the cash dispenser machine may be a cash lockbox structured to facilitate a transaction, for example, a withdrawal or currency exchange. In some arrangements, the cash lockbox includes a camera, a sensor (e.g., a biometric sensor) and a locking mechanism. In some arrangements, the cash lockbox has an ATM-like device inside of it to facilitate dispensing cash. The device may be connected to a repository of cash or each cash lockbox may store the cash within itself, being loaded by an employee of the provider institution at the cash lockbox location or through other automated mechanisms. In other arrangements, the cash lockbox may contain open space for which a user can remove currency (e.g., the cash lockbox may be similar to a locker). The cash lockbox may be configured to incorporate various passcode options and a variety of input devices. In some arrangements, the outside of the cash lockbox has a biometric sensor (e.g., a fingerprint sensor, an eye sensor, a palm scanner, and so on), a card reader, a keypad, a barcode sensor, a key fob sensor, or the like. In other arrangements, a single input terminal for the lockbox location allows a user to select a lockbox number and provide the authentication input. In some arrangements, the passcode options available to the user are limited to the available lockbox authentication devices on the cash lockboxes at the selected cash lockbox location.

In other arrangements, the cash dispenser machine may be a POS device instead of the ATM 104. A POS device can include any type of computing device that may be used to conduct financial transactions. In some arrangements, the POS device may be a POS terminal (e.g., a checkout computing system, a self-service checkout register, a drive-through terminal, etc.) configured to facilitate a transaction for goods associated with the provider institution or a third-party retailer. The POS device may allow a user to withdraw cash (e.g., withdrawing cash from the locked box in a checkout register).

As will be described in greater detail below, the cash request processing circuit 118 receives a signal indicating a request for cash to be delivered (e.g., from customer user device 108), generates the cash delivery request with information on where the customer currently is located based on location data (e.g., GPS data) received from the customer user device 108, how much cash is being requested, a calculated route to deliver the cash, and transmits the processed cash delivery request to one or more driver user devices 106. In some arrangements, the cash request processing circuit 118 is configured to receive data from customer account database 120, cash dispensers' information circuit 122, and CAC circuit 124 in order to finish processing the cash delivery request from customer user device 108. For example, the cash delivery request can use acquired data from cash dispensers' information circuit 122 on the location of several cash dispensers when calculating the delivery route to send in the processed cash delivery request. Further, CAC circuit 124 can generate a CAC to use for verification of the driver 105 at the cash dispenser machine (e.g., ATM 104) and/or a CAC to use for verification between the driver 105 and the customer 107 to send in the processed cash delivery request as well.

The provider computing system 102 is also shown to include a customer account database 120 which can be configured to store a plethora of information regarding customers of the provider institution. In some arrangements, customer account database 120 contains user profiles, personal information (e.g., names, nicknames, addresses, pictures, personal preferences, etc.), transaction history, account data, and other data the provider institution collects and saves regarding customers. For example, a customer may have a personal preference for a driver they want to deliver the cash request (e.g., only drivers with above a 4 out of 5 star rating, only drivers above a certain age, etc.), which can be stored in customer account database 120. Customer account database 120 can store account information relating to accounts held by the customer (e.g., customer 107) with the provider institution. In some examples, customer account database 120 is accessed to determine a bank account number of the customer 107 when the cash request processing circuit 118 generates the processed cash delivery request.

The provider computing system 102 further includes a cash dispensers' information circuit 122, in some examples. Cash dispensers' information circuit 122 can be configured to manage data regarding various cash dispenser machines associated with the provider institution. In some arrangements, cash dispenser machines are ATMs (e.g., the ATM 104), POS devices, cash lockers, or any other machine that has the input and output capabilities to dispense cash to users of the provider institution. In various examples, cash dispensers' information circuit 122 tracks data on the available funds at each cash dispenser machine, the fees charged at each cash dispenser machine for withdrawing cash, the location of each cash dispenser machine, and the functionality of each cash dispenser machine (e.g., whether the cash dispenser machine has operating input/output devices, cash dispenser, display, printer and packer, etc.). The cash dispenser machines associated with the provider institution may have a GPS location that can be tracked by cash dispensers' information circuit 122, or can be connected to network 172 and tracked using WiFi triangulation. The location data of the various cash dispenser machines can be analyzed by cash request processing circuit 118 in calculating the nearest cash dispenser machine with respect to the driver user device 106 and the customer user device 108, or can be used once a cash dispenser machine is chosen by cash request processing circuit 118 in determining the route for the driver 105 from the location of the driver user device 106, to the chosen cash dispenser machine (e.g., ATM 104) to stop to withdraw the cash, to the end destination of the customer user device 108 to deliver the cash to the customer 107.

The system 100 is also shown to include the ATM 104. In general, the ATM 104 is a computing system structured to provide an interface between the user of driver user device 106 (e.g., driver 105) and the provider computing system 102, allowing the driver 105 to retrieve the withdrawn cash to deliver to the customer 107 of the provider institution. For example, in various arrangements, the ATM 104 is configured to allow a user not associated with a bank account (e.g., a checking account being used to withdraw from) to pick up cash withdrawn from the account after authenticating the driver user device 106, indicating the driver 105 is supposed to be retrieving the cash on behalf of the customer 107.

As shown, and for the purpose of clarity, the disclosure contained herein is in reference to a single ATM 104. This depiction is for illustrative purposes only to show an implementation environment of the systems and methods described herein. It should be understood that the provider computing system 102 may be communicably and operatively coupled with multiple ATMs that may have the same or similar characteristics as illustrated with the example arrangement of ATM 104. The ATM 104 is shown to include a network interface circuit 126 that facilitates connection of the ATM 104 to the network 172. The network interface circuit 126 of the ATM 104 is adapted for and configured to establish a communication session via the network 172 between the ATM 104 and other systems, such as the provider computing system 102, the driver user device 106, and the customer user device 108. Accordingly, the network interface circuit 126 includes any of a cellular transceiver (Code Division Multiple Access (CDMA), Global System for Mobile Communications (GSM), Long-Term Evolution (LTE)), a wireless network transceiver (e.g., 802.11X, ZigBee, Bluetooth), or a combination of various transceivers (e.g., both a cellular transceiver, a NFC transceiver, and a Bluetooth transceiver). In some arrangements, the network interface circuit 126 communicates via a secured wired connection within a branch of the provider institution associated with the provider computing system 102. The network interface circuit 126 may be the same or similar as the network interface circuit 110 previously described with reference to the provider computing system 102.

The ATM 104 is also shown to include a processing circuit 128 including a processor 130 and memory 132. The processing circuit 128, processor 130, and memory 132 may be the same or similar as the processing circuit 112, processor 114, and memory 116 described respectively with reference to the provider computing system 102. The ATM 104 is shown to include an input/output (IO) circuit 134 structured to receive and provide communications to a user (e.g., the driver 105 retrieving the cash for the cash delivery request) of the ATM 104 (or, to another entity such as the provider computing system 102). In this regard, the IO circuit 134 is structured to exchange data, communications, instructions, etc. with the driver user device 106 and/or the driver 105. Accordingly, in one arrangement, the IO circuit 134 includes an input/output device such as a display device, a touchscreen, a keyboard, a microphone, a barcode scanner, and/or a quick response (QR) code scanner. In various arrangements, the IO circuit 134 includes communication circuitry for facilitating the exchange of data, values, messages, and the like between an input/out device and the components of the ATM 104. In some arrangements, the IO circuit 134 includes machine-readable media for facilitating the exchange of information between the input/out device and the components of the ATM 104. In still another arrangement, the IO circuit 134 includes any combination of hardware components (e.g., a touchscreen), communication circuitry, and machine-readable media.

The IO circuit 134 includes hardware structured to facilitate input of a CAC by scanning the CAC on a display of driver user device 106 and/or by manual input by the driver 105 or other user designated to retrieve the cash delivery request. In some arrangements, the IO circuit 134 includes a keypad structured to facilitate manual input of the CAC by the driver 105. For example, a driver inputs a CAC of an alphanumeric code displayed on driver user device 106 using a keypad provided by the IO circuit 134. In other arrangements, the IO circuit 134 includes a scanner structured to read the CAC (e.g., a one-time passcode, a QR code, a barcode, etc.), which can be presented to the scanner via a display screen of driver user device 106. For example, the driver 105 presents a QR code that is generated on an interface of driver user device 106 to a scanner provided by the IO circuit 134 for reading of the QR code by the scanner. In some arrangements, the hardware provided by the IO circuit with which the driver 105 can input the CAC depends on the type (e.g., a one-time passcode, a QR code, barcode, alphanumeric, etc.) of CAC received by the driver user device 106. The IO circuit 134 may also include hardware structured to facilitate the input of biometric responses of the user of the ATM 104 (e.g., the driver 105). In some arrangements, the IO circuit 134 includes a biometric sensor (e.g., a fingerprint sensor, an iris scanner, etc.) to determine a biometric response of the driver 105.

In various arrangements, the IO circuit 134 provides components, devices, and/or hardware to facilitate authorization of identification of the driver 105 retrieving the cash delivery request. For example, the generated CAC can include driver authentication (e.g., biometric scan, facial recognition, PIN input, virtual ID card) to confirm the identification of the driver 105 associated with the specific cash delivery request. As such, the IO circuit 134 includes one or more components, devices, and corresponding hardware to verify such identification of the driver 105. The types of components, devices, and hardware provided by the IO circuit 134 are configurable based on the structure of ATM 104 and/or provider preference. For example, a provider institution favors requiring facial recognition of the driver before cash is dispensed for the cash delivery request. Therefore, because of the facial recognition preference, the IO circuit 134 includes a camera 142 and the corresponding hardware to facilitate a facial recognition process.

The ATM 104 is also shown to include a CAC processing circuit 136, which can be configured to receive a CAC and process the CAC to transmit to the provider computing system 102 to determine whether to dispense cash for the cash delivery request. In some arrangements, the CAC processing circuit 136 communicates with IO circuit 134 to receive the CAC from the driver user device 106 and/or the driver 105. Accordingly, the CAC processing circuit 136 is communicably and operatively coupled to the IO circuit 134. In such arrangements, the CAC processing circuit 136 is configured to decipher data (e.g., the cash amount for the associated cash delivery request, driver identification requirements, etc.) from an entered CAC. In several arrangements, the CAC processing circuit 136 is configured to receive and decipher various types of codes in a CAC (e.g., a one-time passcode, a barcode, QR code, alphanumeric, etc.). The provider computing system 102 can generate a unique QR code, barcode, one-time passcode, etc. that is unique to the transaction (e.g., for the authentication at the ATM). In various arrangements, the CAC processing circuit 136 communicates with the CAC circuit 124 to validate the CAC by the backend of provider computing system 102 in order to verify the correct driver 105 at the ATM 104. As such, the CAC processing circuit 136 is also communicably coupled to the CAC circuit 124. For example, CAC processing circuit 136 transmits a CAC to the CAC circuit 124 to decide, by the CAC circuit 124, if the particular CAC exists for a current, ongoing cash delivery request. Additionally, the CAC processing circuit 136 communicates with the CAC 124 of provider computing system 102 to confirm the identification of the driver 105 to guarantee the driver has the right authority to pick up the withdrawn cash. In some examples, in order for the ATM 104 to dispense the cash amount for the cash delivery request, the driver 105 enters a PIN provided by an interface of driver user device 106. Accordingly, the CAC processing circuit 136 receives the PIN and communicates with the provider computing system 102 to confirm whether the driver 105 has the correct identification (e.g., PIN) to withdraw cash.

The ATM 104 includes a display 138 used to present customer information, transaction information, and the like to users of the ATM 104. In this regard, the display 138 is communicably and operatively coupled to the 10 circuit 134 to provide a user interface for receiving and displaying information on the ATM 104. Examples of user interfaces include digital screens, lights, voice instructions, etc. In various arrangements, the display 138 provides instructions (e.g., determined by the 10 circuit 134, determined by the CAC processing circuit 136) to the driver 105 for facilitating withdrawing cash for the delivery request. For example, the display 138 presents an instruction to the driver 105 requesting that the driver 105 inputs a CAC or scans (via a scanner provided by the 10 circuit 134) a CAC. In this regard, the display 138 may be configured to display information (e.g., customer profile details, route location details associated with the cash delivery request) correlating to the CAC entered by the driver 105. In some arrangements, the 10 circuit 134 is configured to send only information on the customer 107 to display 138 that the driver 105 already has access to (e.g., a name), and does not display any of customer 107's financial data (e.g., customer account numbers or the amount of cash being withdrawn for the cash delivery request).

As shown, the ATM 104 includes a cash dispenser 140 configured to dispense a predetermined amount of cash to a user of the ATM 104. In this regard, the cash dispenser 140 is communicatively and operatively coupled to the IO circuit 134 and the CAC processing circuit 136 to dispense an amount of cash associated with the CAC. For example, after facial recognition of the driver 105 is completed via camera 142 and the CAC processing circuit 136 receives confirmation from the provider computing system 102 that the driver 105 is authenticated, the amount of cash specified in the cash delivery request by the customer 107 is dispensed. The ATM 104 also includes a printer and packer 144 configured to operate with the cash dispenser 140 to print envelopes, pack the dispensed cash within the envelopes, and seal the envelopes before dispensing to the driver 105. Printer and packer 144 can also be configured to print a new CAC received from CAC processing circuit 136 on the front of an envelope with the cash for the cash delivery request inside. In some arrangements, printer and packer 144 print the same CAC received from the driver user device 106 at the ATM 104 on the front of the sealed envelope. Therefore, printer and packer 144 is communicatively and operatively coupled to the CAC processing circuit 136.

The system is also shown to include a driver user device 106, which is a computing device associated with a user (e.g., the driver 105 or another designee to deliver the cash request). The driver user device 106 includes any type of computing device that is used to interact with online applications and/or receive information from the provider computing system 102, the ATM 104, and/or the customer user device 108. In some arrangements, the driver uses the driver user device 106 to both communicate information to the provider computing system 102 over the network 172, as well as communicate information with the ATM 104 and customer user device 108. In this regard, the driver user device 106 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The driver user device 106 may also include any type of mobile device including, but not limited to, a phone (e.g., smart phone), table, personal digital assistant, and/or computing devices (e.g., desktop computer, laptop computer, personal digital assistant).

In the example arrangement of FIG. 1, the driver user device 106 includes a network interface circuit 146 enabling the user device 106 to exchange information over the network 172, a processing circuit 148, and a location position sensor 156. The processing circuit 148 is shown to include a processor 150 and memory 152. The processing circuit 148, processor 150, and memory 152 may be the same or similar as the processing circuit 112, processor 114, and memory 116 respectively described with reference to the provider computing system 102.

The network interface circuit 146 of the driver user device 106 is adapted for and configured to establish a communication session via the network 172 between the driver user device 106 and other systems, such as the provider computing system 102, ATM 104, and the customer user device 108. Accordingly, the network interface circuit 146 includes any of a cellular transceiver (CDMA, GSM, LTE, a wireless network transceiver (e.g., 802.11X, ZigBee, Bluetooth), or a combination of various transceivers (e.g., both a cellular transceiver, a NFC transceiver, and a Bluetooth transceiver). In some arrangements, the network interface circuit 146 communicates via a secured wired connection within a branch of the provider associated with the provider computing system 102. The network interface circuit 146 may be the same or similar as the network interface circuit 110 previously described with reference to the provider computing system 102.

The cash delivery application circuit 154 is structured to provide displays to the driver user device 106 that enable the driver to use an application to manage cash delivery requests associated with the provider institution. Accordingly, the cash delivery application 154 is communicably and operatively coupled to the provider computing system 102. In some arrangements, the cash delivery application circuit 154 may be incorporated with an existing application in use by the provider institution (e.g., a mobile banking application or a mobile wallet application) or may be incorporated with an existing third-party application (e.g., a mobile ride sharing application). In other arrangements, the cash delivery application circuit 154 may be downloaded by the driver user device 106 prior to its usage, hard-coded into the memory 152 of the driver user device 106, or be a web-based interface application, which may be executed remotely from the driver user device 106. In the latter instance, the user may have to log onto or access the web-based interface before usage of the application. Further, and in this regard, the cash delivery application circuit 154 may be supported by a separate computing system including one or more servers, processors, network interface circuits, etc. that transmit applications for use to the driver user device 106. In certain arrangements, the cash delivery application circuit 154 includes an API and/or a software development kit (SDK) that facilitate the integration of other applications with the cash delivery application circuit 154.

In various arrangements, and as will be described in greater detail with the various use-case scenarios below, the cash delivery application circuit 154 is configured to present to customers of the provider institution an application to send and receive requests for a cash delivery via a user interface of a user device (e.g., driver user device 106 or the customer user device 108). In such arrangements, the cash delivery application circuit 154 is communicatively coupled to the network interface circuit 146 and the location position sensor (e.g., location position sensor 156) of the user device in order to transmit the cash delivery request to the provider computing system 102. The cash delivery application circuit 154 may be configured to track the position of the user device (e.g., the driver user device 106) using data acquired from the location position sensor 156. Using the location information received from one or more driver user devices, the provider computing system 102 may determine which drivers to send a generated cash delivery request to by calculating the distance between the location of the customer user device 108 and the location of the one or more driver user devices 106. In some arrangements, the cash delivery application circuit 154 presents the driver of a cash delivery request with several options to accept, cancel, and view further details on a request the driver 105 is in the process of delivering to the customer 107. For example, the drivers for a currently unaccepted cash delivery request are presented with one or more options including, but not limited to, viewing the driver profile, viewing a customer profile for the user who made the cash delivery request, viewing the calculated delivery route, accepting the cash delivery request, and viewing the delivery route information. In another example, a driver who does not hold a driver's account with the provider is presented with the option to register to drive for the cash delivery service associated with the provider institution. In some arrangements, the driver 105 may also hold an account (e.g., a savings account, a credit account, a checking account) with the provider institution associated with the provider computing 102 and want to make cash delivery requests as well. In this case, the driver 105 may toggle between a customer of the cash delivery application or a driver for the cash delivery application via a user interface presented by the cash delivery application circuit 154.

The location position sensor 156 of driver user device 106 is structured to receive location data and determine a location or receive information indicative of a location of the user device 106. In one arrangement, the location position sensor 156 includes a global position system (GPS) or any other type of location position system. As such, the location position sensor 156 receives latitude data, longitude data, and other types of location or position data to determine the location of the driver user device 106. In other arrangements, the location position sensor 156 receives an explicit location identification from the driver 105 of the driver user device 106. All such variations are intended to fall with the spirit and scope of the present disclosure.

The system is also shown to include a customer user device 108, which is a computing device associated with a user (e.g., the customer of the provider institution making the request for cash). The customer user device 108 may include any type of computing device that is used to interact with online applications and/or receive information from the provider computing system 102, the ATM 104, and/or the driver user device 106. In some arrangements, the customer uses the customer user device 108 to both communicate information to the provider computing system 102 over the network 172 as well as communicate information with the ATM 104 and the driver user device 106. In this regard, the customer user device 108 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The user device may also include any type of mobile device including, but not limited to, a phone (e.g., smart phone), table, personal digital assistant, and/or computing devices (e.g., desktop computer, laptop computer, personal digital assistant). The customer user device 108 may be the same or similar as the driver user device 106 previously described.

In the example arrangement of FIG. 1, the customer user device 108 includes a network interface circuit 160 enabling the customer user device 108 to exchange information over the network 172, a processing circuit 162, and a location position sensor 170. The processing circuit 162 is shown to include a processor 164, memory 166, and cash delivery application circuit 168. The processing circuit 162, processor 164, and memory 166 may be the same or similar as the processing circuit 112, processor 114, and memory 116 respectively described with reference to the provider computing system 102. The cash delivery application circuit 168 may be the same or similar as the cash delivery application 154 of the driver user device 106.

The network interface circuit 160 of the customer user device 108 is adapted for and configured to establish a communication session via the network 172 between the customer user device 108 and other systems, for example, the provider computing system 102, the ATM 104, and the driver user device 106. Accordingly, the network interface circuit 160 includes any of a cellular transceiver (CDMA, GSM, LTE, a wireless network transceiver (e.g., 802.11X, ZigBee, Bluetooth), or a combination of various transceivers (e.g., both a cellular transceiver, a NFC transceiver, and a Bluetooth transceiver). In some arrangements, the network interface circuit 160 communicates via a secured wired connection within a branch of the provider institution associated with the provider computing system 102. The network interface circuit 160 may be the same or similar as the network interface circuit 110 previously described with reference to the provider computing system 102.

In various arrangements, the location data received by the location position sensor 170 is used (e.g., by the cash delivery application circuit 168 and/or by the provider computing system 102) to determine one or more ATMs (e.g., ATM 104) associated with the provider institution of the provider computing system 102 that are nearest the customer. In such arrangements, the cash delivery application circuit 168 presents the one or more ATMs nearest the customer 107 to provider computing system 102 to use in determining a route for the driver 105 to stop at one of the one or more ATMs before delivering the cash request to the customer 107. The location data received by the location position sensor 170 can be used by the provider computing system 102 and the driver user device 106 for tracking the current location of the customer user device 108. In this regard, the provider computing system 102 can determine which driver user devices 106 are nearest the user and can use the location of the customer user device 108 as the end destination when determining the delivery route (e.g. by cash request processing circuit 118).

Figure 2:
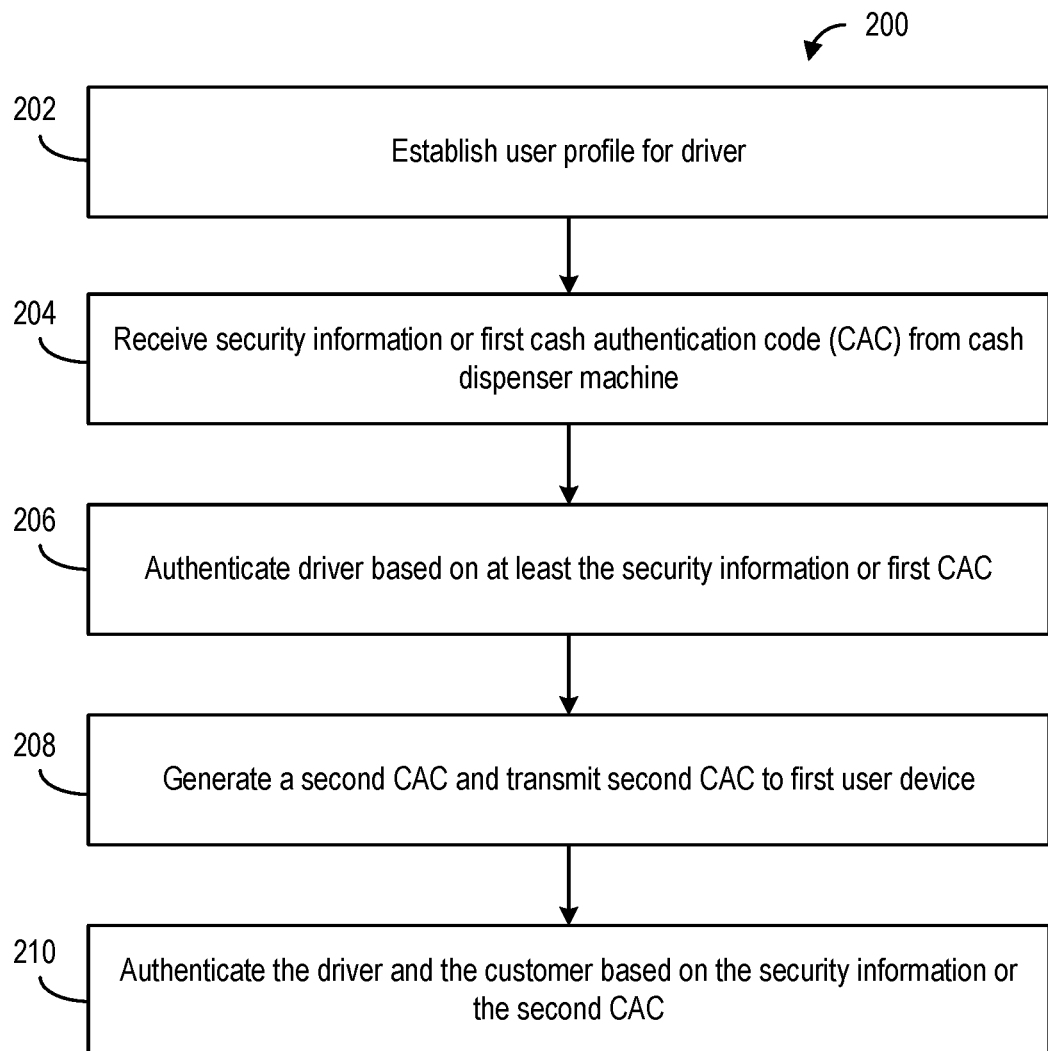
FIG. 2 is a flow diagram illustrating a method for providing authentication with respect to a cash delivery request made by a customer using a customer user device, according to various arrangements.

Referring to FIG. 2, a flow diagram illustrating a method 200 for providing authentication with respect to a cash delivery request made by customer 107 using a customer user device 108 (FIG. 1) is depicted, according to various arrangements. Referring to FIGS. 1A-2, the method 200 is executed by the provider computing system 102. At 202, cash request processing circuit 118 of the provider computing system 102 may establish a user profile for the driver 105 to save in memory 116. In some arrangements, the driver 105 previously provided all the information needed for the user profile to the provider computing system 102. In other arrangements, the information is issued and assigned to the user profile of the driver 105 by the provider computing system 102 based on previously provided information from driver 105, for example, in the case of a PIN or virtual identity card. The user profile may include an image of the driver 105, a biometric response of the driver 105 (e.g., fingerprint scan, eye scan, voice recognition test data, facial recognition data, and so on), a virtual identity card for the driver 105, or a Personal Identification Number (PIN) for the driver 105 that is saved and updated by the provider computing system 102. The information in the user profile for the driver 105 stored by the provider computing system 102 may be collected from the driver 105 when the driver 105 registers with the provider institution for the delivery service via an online cash delivery application. For example, the driver 105 can upload an image of the driver 105 via the driver user device 106 as part of completing registration for the online cash delivery application. In other examples, the driver 105 provides a biometric response (e.g., a fingerprint scan, an iris scan, etc.) via the driver user device 106, which is then transmitted to the provider computing system 102 and stored by the provider computing system 102 together with other types of information (e.g., name of the driver 105, contact information of the driver 105, address of the driver 105, vehicle of the driver 105, etc.), making up the user profile. In some arrangements, the user profile of the driver 105 is updated by the provider computing system 102 after a predetermined amount of time (e.g., a new PIN is assigned to the user profile of the driver 105 after 6 months from issuing the previous PIN, a new image of the driver 105 is required after a year, etc.) to increase the security of the cash deliveries.

The CAC code circuit 124 may be configured to receive security information or a first CAC from a cash dispenser machine (e.g., the ATM 104) (204). The cash dispenser machine may obtain the security information or the first CAC from the driver user device 106 or the driver 105. For example, the first CAC is a QR code displayed via the driver user device 106 that is scanned by the camera 142 of the cash dispenser machine. In other arrangements, the driver 105 provides security information, such as a biometric response, to the ATM 104, which can be scanned by the biometric sensor of ATM 104 and processed via IO circuit 134. The security information received from the cash dispenser machine for each cash delivery request may include an image of the driver, a virtual identity card of the driver, a biometric response of the driver, a PIN for the driver, etc. In some examples, the security information received from the ATM 104 also includes a CAC in the security information (e.g., a virtual identity card contains a barcode or a QR code, etc.). The security information may then be compared by the provider computing system 102 to determine if the received security information corresponds with information in the user profile of the driver 105 delivering the cash that the provider computing system 102 stores in the memory 116.

At 206, the CAC circuit 124 is configured to authenticate the driver 105 based on either the security information or the first CAC received. In some arrangements, the CAC circuit 124 compares whether the first CAC received matches a CAC sent to the correct driver user device 106 when the cash delivery request was processed by the provider computing system 102. In some arrangements, the CAC circuit 124 confirms whether the security information (e.g., a captured image of the driver 105 at ATM 104) is a match for information on the driver 105 saved in memory 116 (e.g., a picture of the driver 105 for the driver's user profile). The CAC circuit 124 may run facial recognition algorithms (e.g., geometric based algorithms, neural networks based algorithms such as the Principal Component Analysis (PCA), Discrete Cosine Transform (DCT), and Hidden Markov Models) on the received image of the user at the ATM 104 to determine if the user is the correct driver 105.

The CAC circuit 124 can be configured to generate a second CAC, and the network interface circuit 110 can be configured to transmit the second CAC to the driver user device 106, at 208). In some arrangements, after or in response to the first CAC or security information being authenticated by the provider computing system 102, additional CACs are generated in order to strengthen the security protocol for the cash delivery request. The number of CACs or security information required by the provider computing system 102 before cash is dispensed at the ATM 104 may correspond with the amount of money being withdrawn for the cash delivery request (e.g., the more money that is requested to deliver to the customer user device 108, the more authentication is required so more CACs are sent and received to verify the identity of the driver 105). In some arrangements, the second CAC is the same type of CAC as the first CAC sent to the driver user device 106 (e.g., both the first and the second CAC are QR codes, both the first and the second CAC are the same QR code, etc.). In other arrangements, the second CAC is a different type of CAC than the first CAC transmitted to the driver user device 106 (e.g., the first CAC is a barcode and the second CAC is an alphanumeric code, the first CAC is a QR code and the second is an alphanumeric code, and so on).

At 210, the CAC circuit 124 is configured to authenticate the driver 105 and the customer 107 based on the security information or the second CAC. The CAC circuit 124 may authenticate the driver 105 and the customer 107 in a similar manner as at 206, but with the involvement of the customer user device 108 instead of the ATM 104. In some arrangements, the second CAC is sent to the driver user device 106 and the authentication by the provider computing system 102 occurs after the customer user device 108 scans the second CAC on the interface of the driver user device 106. In this example, the customer user device 108 then sends the scanned CAC back to the provider computing system 102, the provider computing system 102 compares the scanned CAC to what the provider computing system 102 transmitted to the driver user device 106 as the second CAC, and then the provider computing system 102 authenticates both users if there is a match between the scanned QR code and the second CAC sent to the driver user device 106. In other arrangements, the second CAC is sent to the customer user device 108 to be scanned by the driver user device 106 during the "handshake" (i.e., when the driver 105 meets the customer 107 and transfers the withdrawn cash over to the customer 107) between the driver 105 and the customer 107. For example, in some examples, the customer user device 108 is displaying a barcode (the same barcode or a different barcode as the first CAC) on the display screen of the device, and the driver user device 106 uses a camera to scan the barcode. The driver user device 106 then sends the scanned barcode to the provider computing system 102, the provider computing system 102 compares the scanned barcode to the barcode sent as the second CAC to the customer user device 108, and the provider computing system 102 authorizes the users if there is a successful match between the scanned barcode and the barcode of the second CAC. The second CAC and the security information may both be used by the provider computing system 102 before authentication occurs, or only one or the other may be used to finish authenticating the cash delivery request at the second authentication stage (e.g., a virtual identity card and a QR code are both used, only a virtual identity card is used, or only a barcode is used for the second stage of authentication). For example, after a QR code is verified by the provider computing system 102, a PIN for the driver 105 is entered by the customer 107 via a user interface of the customer user device 108, the customer user device 108 transmits the PIN to the provider computing system 102, and the provider computing system 102 then compares if the transmitted PIN matches a PIN saved in the user profile of the driver 105 before authentication is completed. In other examples, a virtual identity card is displayed on the driver user device 106, the customer user device 108 uses a camera to take a picture of the virtual identity card displayed, the virtual identity card is transmitted to the provider computing system 102 by the customer user device 108, and the provider computing system 102 determines if there is a match between the received virtual identity card and a virtual identity card saved in the driver 105's user profile. In some arrangements, the provider computing system 102 verifies that the location of the customer user device 108 is at the same location of the driver user device 106, and in response to determining the locations from the respective GPS data from each user device match, a portable cash lockbox containing the withdrawn cash automatically opens.

Figure 3:
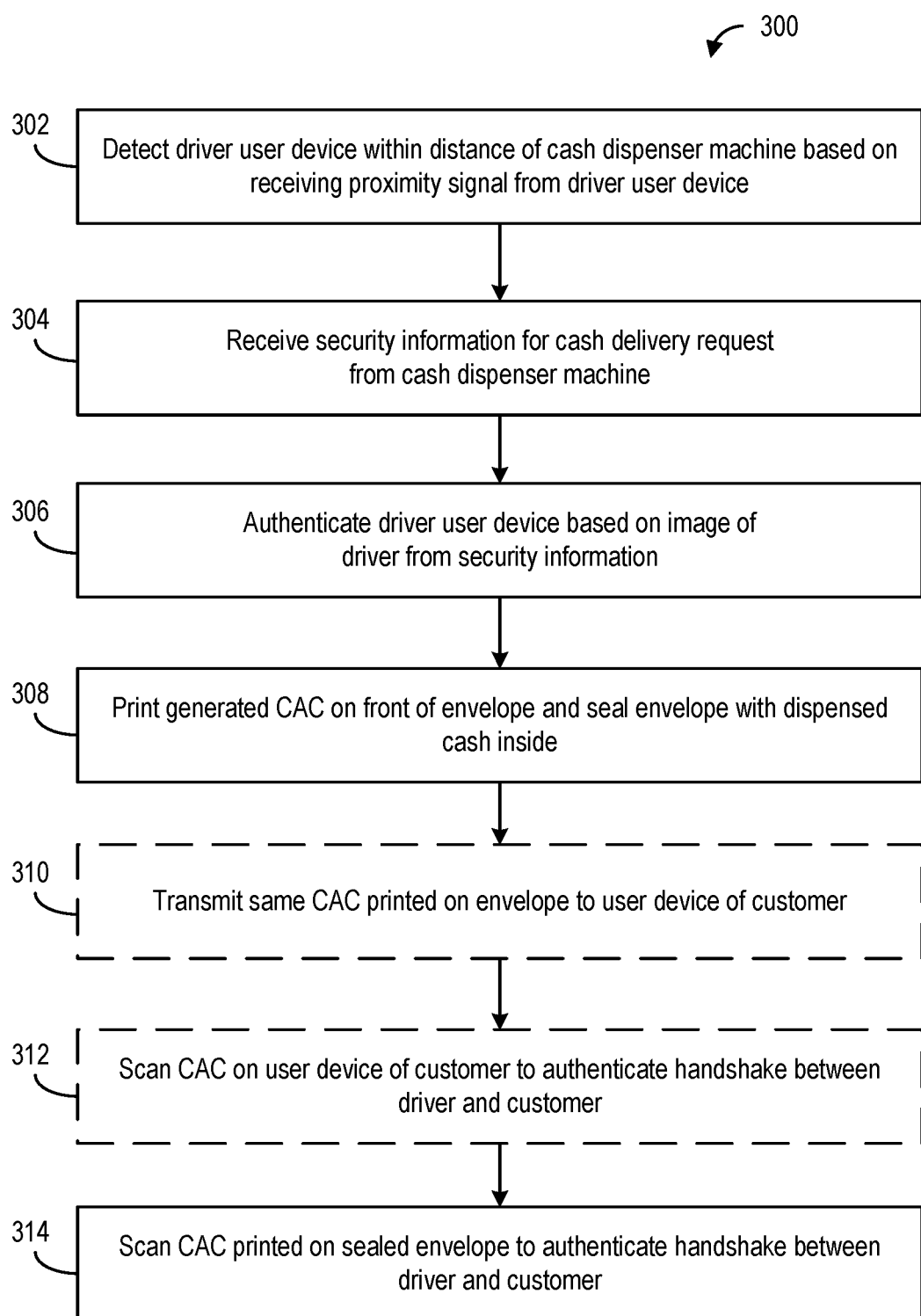
FIG. 3 is a flow diagram according to an example of a method for providing authentication with respect to a cash delivery request, according to various arrangements.

Referring now to FIG. 3, a flow diagram depicting a method 300 for providing authentication with respect to a cash delivery request is shown, according to one arrangement. The method 300 is performed by the provider computing system 102. The method 300 can be an example implementation of the method 200. The CAC circuit 124 can be configured to detect the driver user device 106 within a distance of the cash dispenser machine (e.g., the ATM 104) after the network interface circuit 110 receives a proximity signal from the driver user device 106 (at 302). In some arrangements, the provider computing system 102 determines that the driver user device 106 is within a predetermined distance (e.g., 5 feet) of the cash dispenser machine using GPS data from the location sensor 156 of the driver user device 106 sent via the network 172 and data on the location of various cash dispenser machines from cash dispensers' information circuit 122. The provider computing system 102 may only receive proximity signals within a certain range of the cash dispenser machine (e.g., 5 feet) in order to increase the security of the cash delivery request and of the customer 107's accounts associated with the provider institution (e.g., checking account, savings account, and so on).

At 304, the CAC circuit 124 can be configured to receive security information for a cash delivery request from the ATM 104 via the network 172. In one arrangement, the security information includes a captured image of the driver 105 at the ATM 104 via the camera 142. In other arrangements, the ATM 104 may scan a virtual identity card displayed on the driver user device 106 and may transmit the virtual identity card to the provider computing system 102. In yet another arrangement, the security information sent to the provider computing system 102 includes a fingerprint of the driver 105 taken at the ATM 104 using a fingerprint scanner. In some arrangements, 304 is performed similar to 204 of method 200 (FIG. 2).

At 306, the CAC circuit 124 can be configured to authenticate the driver user device 106 using the security information (e.g., the image of the driver 105) for the cash delivery request. In the example in which the security information includes an image of the driver 105 taken at the cash dispenser machine, the captured image can be received and compared with an image of the driver 105 from the user profile stored in the memory 116 using facial recognition methods. If the two images are determined to match by the provider computing system 102, the driver user device 106 may be sent a notification indicating the first step of authentication of the driver 105 was successful (e.g., in user interface 650 of FIG. 6A). In some arrangements, if the CAC circuit 124 determines that the images of the user at the ATM 104 and the driver 105 who is supposed to perform the cash delivery do not match (e.g., a percent certainty of a match is below a threshold percentage, such as 95%), the provider computing system 102 may cancel the cash delivery request and the one or more CACs corresponding to the cash delivery request may expire. Additionally, the provider computing system 102 may only authenticate the driver user device 106 if the driver user device 106 is also determined to be within a certain proximity of the ATM 104 (e.g., less than 10 feet) when the security information (e.g., the image of the driver 105) is received by the provider computing system 102.

At 308, the printer and packer 144 can be configured to print a generated CAC on the front of an envelope and seal the envelope with the dispensed cash inside after receiving instructions from the provider computing system 102 to dispense the cash. The CAC circuit 124 can be configured to create the instructions to dispense cash after and in response to the first authentication stage of verifying the correct driver user device 106 and the identity of the driver 105 at the cash dispenser machine is successfully completed. In some arrangements, the CAC circuit 124 also generates a new CAC (e.g., a barcode, one-time passcode, a QR code, etc.) to send to the ATM 104. In response to the cash dispenser machine (e.g., the ATM 104) receiving the new CAC, the printer and packer 144 of the cash dispenser machine prints, on an outer surface (e.g., a front surface) of the envelope, the new CAC. The printer and packer 144 seals the envelope before dispensing the sealed envelope to the driver 105 to prevent the driver 105 from having the ability to open the envelope and count/manipulate the cash inside. The envelope may not contain any other information regarding the cash delivery request besides the printed new CAC. As such, the driver 105 cannot access the personal information of the customer 107 and is unaware of the amount of cash that is withdrawn.

In some arrangements, the provider computing system 102 transmits the same CAC printed on the envelope produced at the cash dispenser machine to customer user device 108 as well (at 310). In the example in which the CAC is a barcode or a QR code printed on the sealed envelope, the provider computing system 102 transmits the barcode or the QR code to the customer user device 108 to use at the second authentication stage in the two-way authentication of the driver 105 and the customer 107. In some arrangements, the driver user device 106 scans the CAC transmitted to the customer user device 108, and the customer user device 108 scans the CAC printed on the sealed envelope to finish authenticating the delivery of the cash request to the location of the customer user device 108. Block 310 may be optional, such that the method 300 may proceed from block 308 directly to block 314 (shown as the dashed dotted lines). In some arrangements, block 310 is performed during the method 300 in order to increase the security and protection of the cash delivery request.

After 310, the same CAC displayed on the customer user device 108 may be scanned for the CAC circuit 124 to authenticate the "handshake" between the driver 105 and the customer 107 (312). The "handshake" refers to the delivery of the cash to the customer and verifying that the customer is the correct customer operating the customer user device 108 and that the driver 105 is carrying the correct amount of cash for the cash delivery request. A camera of the driver user device 106 can be configured to scan a CAC from the customer user device 108. In some arrangements, 312 may occur only if 310 is performed by the provider computing system 102; otherwise, the method 300 may bypass 312 and proceed directly to 314. In some arrangements, block 312 is also optional (indicated by the dashed lines) in method 300 that can be performed in order to add additional security and authorization protocols. In other arrangements, after 308, method 300 proceeds directly to 314 and the CAC printed on the sealed envelope is scanned by the customer user device 108 in order to authenticate the handshake between the driver 105 and the customer 107. CAC circuit 124 may authenticate the transaction in a similar manner to 206 and 210 of method 200 (FIG. 2). 314 may be similar or the same as the block 210 (FIG. 2) of the method 200, except in this example, instead of scanning a CAC displayed on the driver user device 106 or the customer user device 108, the CAC is scanned from the printed envelope.

Figure 4:
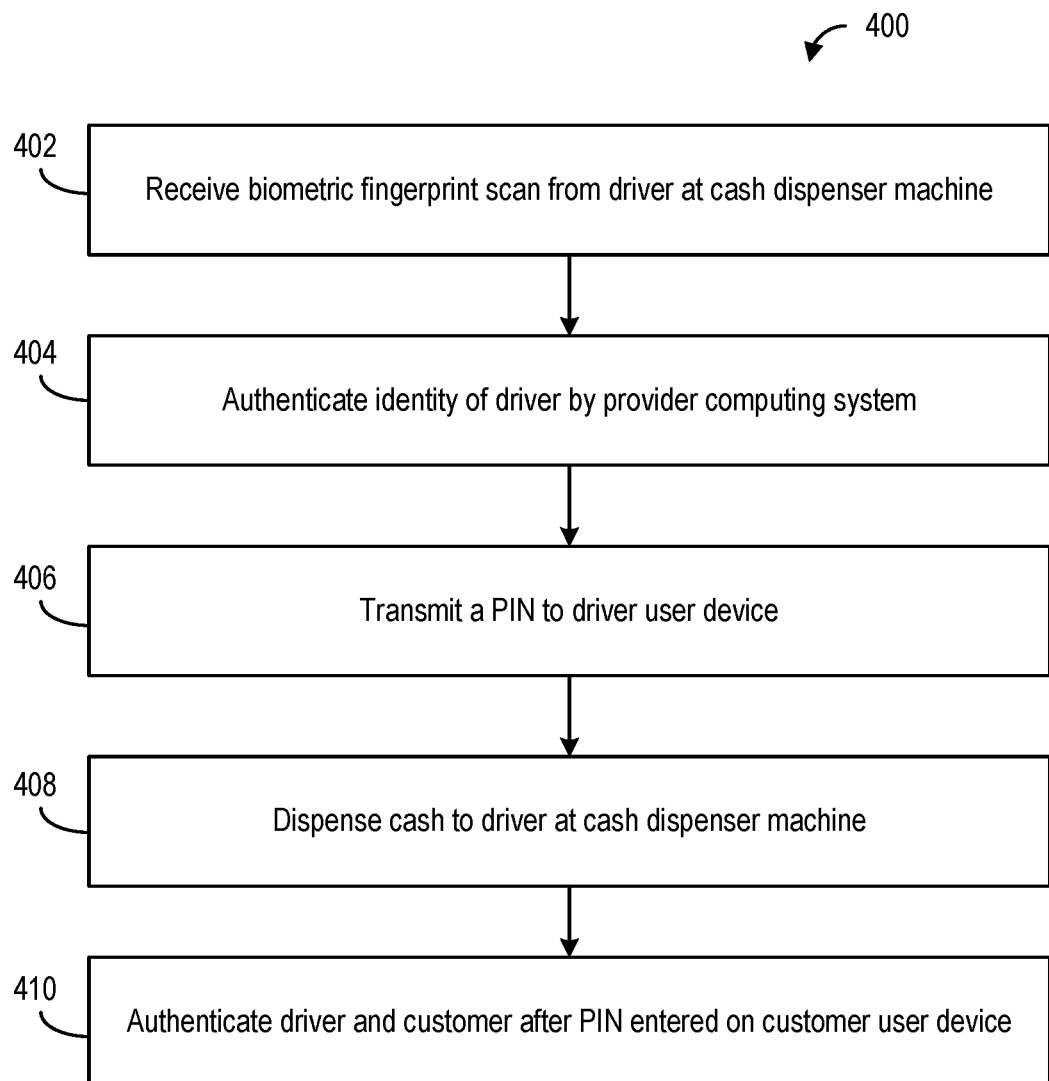
FIG. 4 is a flow diagram according to another example of a method for providing authentication with respect to a cash delivery request, according to various arrangements.

Referring now to FIG. 4, a flow diagram depicting a method 400 for providing authentication with respect to a cash delivery request is shown, according to another arrangement. Method 400 can also be performed by the provider computing system 102 in a similar manner as method 200 (FIG. 2). At 402, IO circuit 134 can be configured to receive a fingerprint scan from the driver 105 at the cash dispenser machine and network interface circuit 126 can be configured to transmit the fingerprint scan to the provider computing system 102. In other arrangements, a different biometric response of the driver 105 may be taken at the cash dispenser machine (e.g., the ATM 104), such as eye scans or voice recordings for a voice recognition test. Method 400 illustrates another example of the method 200 (FIG. 2), with 402 being another example of the how 204 in method 200 may be performed.

The CAC circuit 124 is configured to authenticate the identity of the driver 105 using the security information received at 402 (404). In some arrangements, the CAC circuit 124 compares the fingerprint scan received at 402 to a fingerprint of the driver 105 in a user profile of the driver 105, stored in memory 116 of the provider computing system 102. In some arrangements, 404 is performed in the same or similar manner as how 206 in method 200 is performed by the provider computing system 102.

At 406, CAC circuit 124 may be configured to generate a PIN and the PIN may be transmitted to the driver user device 106 via the network 172. Once the first stage (i.e., the authentication between the driver 105 and the cash dispenser machine) of authenticating the driver 105 for the cash delivery request is successfully completed, a new CAC may be generated and transmitted to the driver user device 106 to use in authenticating the driver 105 in the second stage (hence the two way authentication process described herein) during the exchange between the driver 105 and the customer 107. In some arrangements, the PIN is a new, unique code for the current cash delivery request. In some arrangements, the PIN is only valid while the location of the driver user device 106 is determined to be in a location given by the calculated delivery route. In this regard, if the location of the driver user device 106 deviates from the calculated delivery route a predetermined distance, the provider computing system 102, via the CAC circuit 124, may expire the PIN and may cancel the cash delivery request. In this example, the PIN is transmitted before the cash is dispensed at 408, as shown by method 400. However, in other arrangements, the cash may be dispensed first after the authentication of the driver 105 from the fingerprint scan and the PIN may not be transmitted until the location specified by the GPS data from the driver user device 106 is at the location specified by the GPS data from the customer user device 108.

At 408, the printer and packer 144 of the ATM 104 can be configured to dispense the cash to the driver 105 at the cash dispenser machine after the network interface circuit 126 receives instructions from the provider computing system 102. The ATM 104 seals the envelope with the withdrawn cash inside so the driver 105 may not look at how much cash was withdrawn for the cash delivery request and so the driver 105 may not open the envelope without the customer 107 determining that the envelope was opened before being delivered. In some arrangements, 408 is performed similarly as 308 in method 300, but without the printing of the CAC on the front of the envelope.

The CAC circuit 124 can be configured to authenticate the driver 105 and the customer 107 after the PIN sent at 406 is entered on the customer user device 108. During the "handshake" between the driver 105 and the customer 107, the driver user device 106 may display the PIN transmitted to the driver user device 106 on its user interface. The displayed PIN may then be entered via the customer user device 108. The CAC circuit 124 can verify that the PIN is for the active cash delivery request and that the PIN sent to the driver user device 106 matches the PIN entered and sent to the provider computing system 102 via the customer user device 108. In this example, the customer user device 108 may display a user interface similar to user interface 700 (FIG. 7), with the exception of a PIN entry input box replacing the barcode 708.

Figure 5:
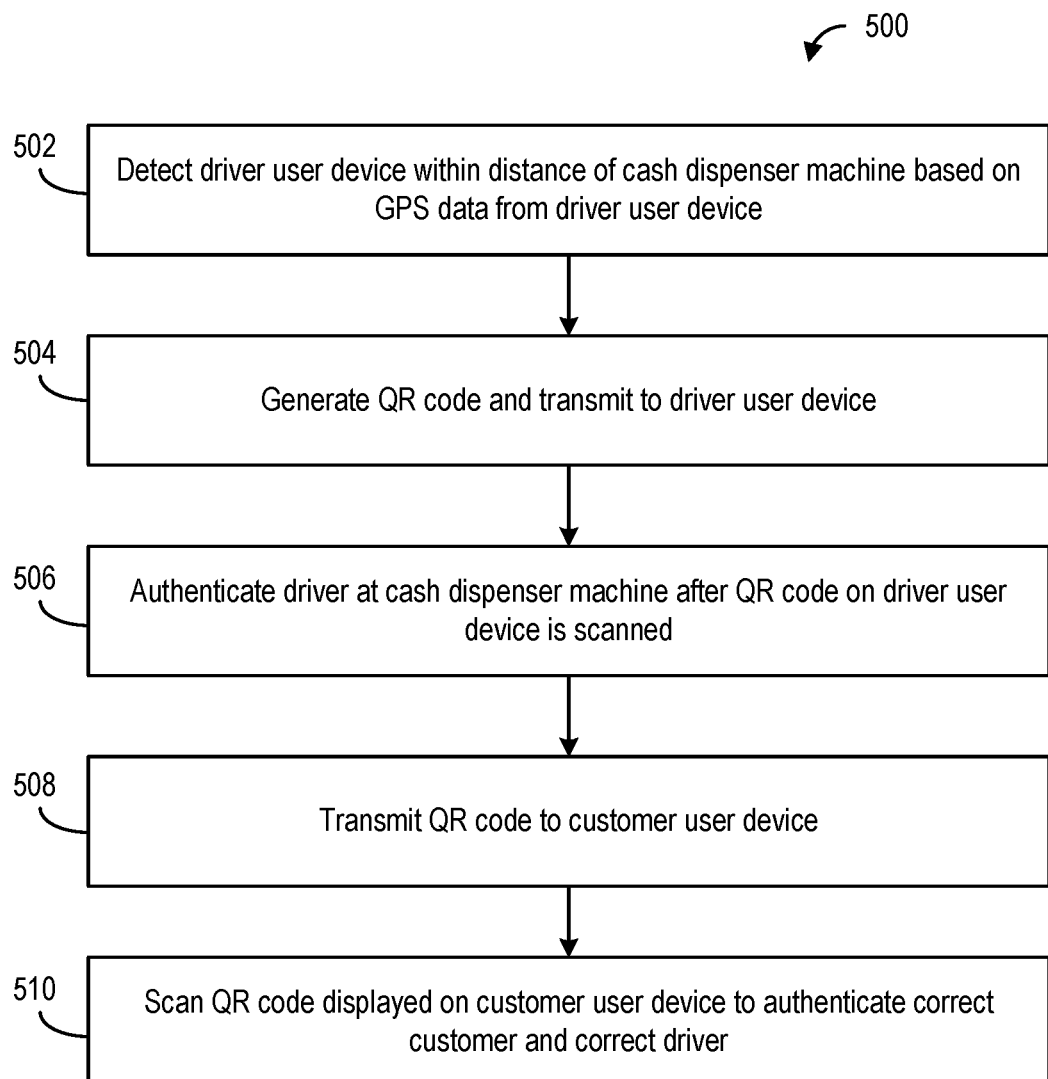
FIG. 5 is a flow diagram according to yet another example of a method for providing authentication with respect to a cash delivery request, according to various arrangements.

Referring now to FIG. 5, a flow diagram illustrating a method 500 for providing authentication with respect to a cash delivery request is shown, according to another arrangement. Method 500 can also be performed by the provider computing system 102 in a similar manner as method 200 (FIG. 2). Method 500 illustrates another example of how method 200 (FIG. 2) may be executed by the provider computing system 102. At 502, the provider computing system 102 can be configured to detect the driver user device 106 within a predetermined distance of the cash dispenser machine (e.g., the ATM 104) using the GPS data from the driver user device 106. 502 may be performed by the provider computing system 102 in the same or similar way as 308 of method 300 (FIG. 3).

Figure 6:
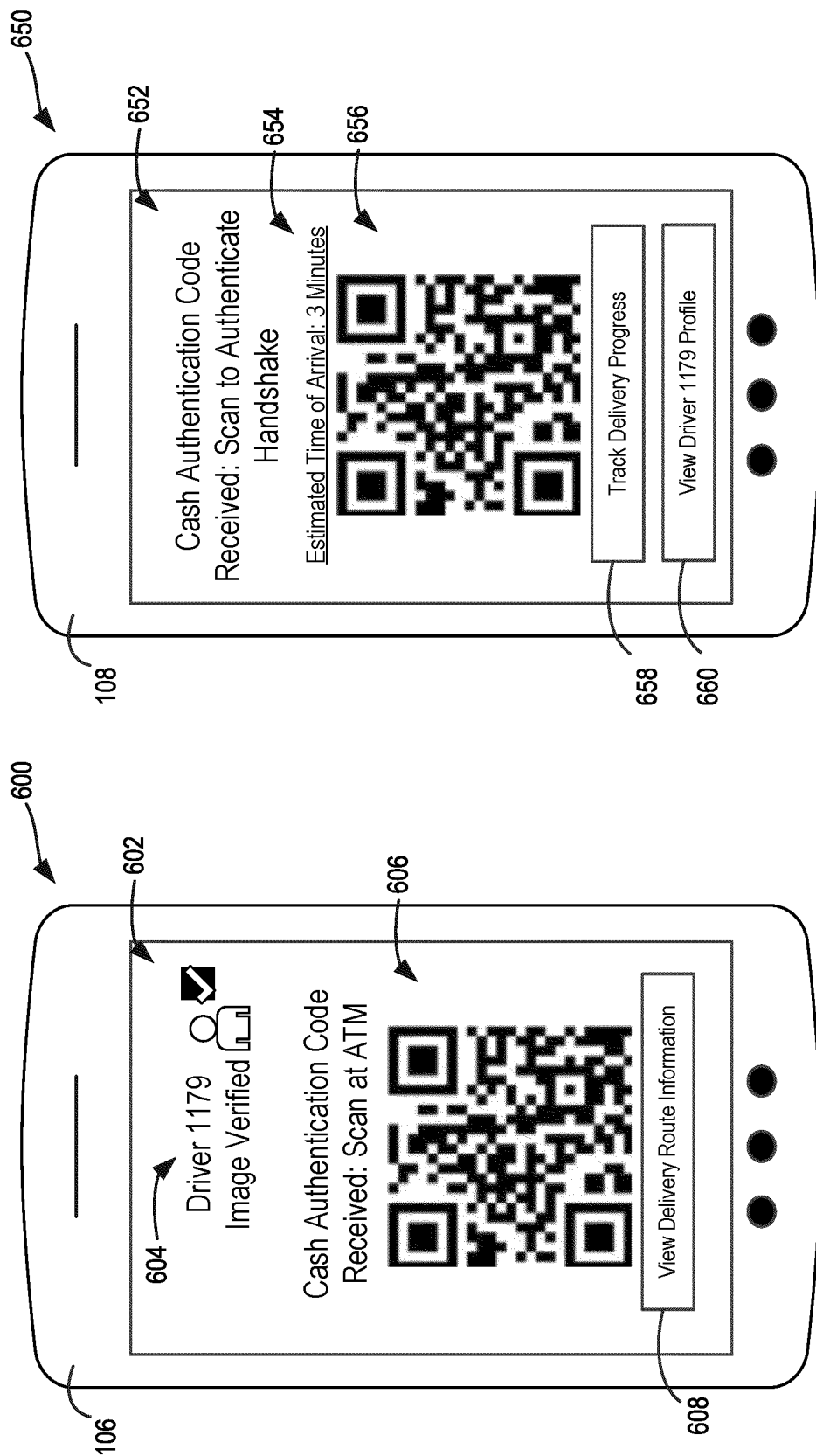
FIG. 6A and FIG. 6B are schematic drawings depicting example user interfaces of the driver user device and customer user device, respectively, used in the environment of FIG. 1, according to various arrangements.

CAC circuit 124 may be configured to generate a QR code and the QR code may be transmitted to the driver user device 106 via the network 172. In other arrangements, instead of a QR code, the CAC is a different type of code, such as a barcode, a one-time access code, an alphanumeric code, and so on. After the QR code is transmitted to the driver user device 106, a user interface may be displayed on the driver user device showing the QR code and instructions on how to use the CAC for authentication, such as user interface 600 (FIG. 6A). In some arrangements, the QR code may be in the background of the online cash delivery application and not viewable via the driver user device 106, however, the provider computing system 102 may still receive the CAC via NFC from network 172. For example, the NFC transceiver of network interface circuit 146 of the driver user device 106 may receive a NFC signal, generated uniquely for the cash delivery request, from the network interface circuit 110 of the provider computing system 102. Then, the driver user device 106 may broadcast the received NFC signal to the ATM 104 via the NFC transceiver of the network interface circuit 146. In some examples, the driver user device 106 may broadcast the received NFC signal in response to the driver user device 106 (e.g., the cash delivery application circuit 154) determining that a location of the driver user device 106 (as determined by the location position sensor 156) is within a predetermined distance (e.g., 10 feet, 5 feet, and so on) of the location of the ATM 104. The driver user device 106 receives the location of the ATM 104 is received from the provider computing system 102. The ATM 104 may detect the NFC signal from the driver user device 106 via a NFC transceiver of the network interface circuit 126 of ATM 104. In response to detecting the NFC signal, the ATM 104 sends the received NFC signal via the network 172 to the provider computing system 102, such that the provider computing system 102 can determine whether the received NFC signal matches the NFC signal sent to the driver user device 106 to complete the authentication.

At 506, the CAC circuit 124 can authenticate the driver 105 at the cash dispenser machine after the QR code on the driver user device 106 is scanned by the cash dispenser machine (e.g., via the camera 142). The CAC circuit 124 can authenticate the driver 105 at the cash dispenser machine by confirming that the QR code scanned by the cash dispense machine (e.g., the ATM 104) is a match for the QR code transmitted to the driver user device 106 in 504. The QR code may then be transmitted to the customer user device 108 by the network interface circuit 110 of provider computing system 102 (508). The automatic and semi-automatic transmitting of authentication devices (e.g., security information and/or CACs) can help decrease the risk of user error and can increase security when having another user withdraw cash from a customer's account on the behalf of the customer.

Once the QR displayed on the customer user device 108 is scanned by a camera of the driver user device 106, the CAC circuit 124 can authenticate the correct customer 107 and the correct driver 105 associated with the corresponding cash delivery request (510). The CAC circuit 124 can determine whether the QR code received from the driver user device 106 matches the QR code that was transmitted by the provider computing system 102 to the customer user device 108. In some arrangements, the CAC circuit 124 further verifies the cash delivery request after the scanned QR code is received from the driver user device 106 by determining whether the location of the driver user device 106 is at approximately the same location as the customer user device 108 (e.g., from GPS data received from each respective user device). After the second stage of authentication is accomplished, a new user interface on the online mobile cash delivery application may be displayed on the customer user device 108 to receive customer input on the customer experience. For example, options for providing feedback on the cash delivery request and entering a rating and review of the driver 105 may be provided via an interface of the customer user device 108.

Referring now to FIGS. 6A and 6B, example user interfaces for user devices linked to the cash delivery request is shown, according to various arrangements. Referring specifically to FIG. 6A, example user interface 600 for the driver user device 106 is depicted, according to an example arrangement. The user interface 600 may be displayed on the driver user device 106 while the location of the driver user device 106 is at the location of the cash dispenser machine (e.g., the ATM 104). In some arrangements, the user interface 600 is displayed after a biometric response (e.g., fingerprint, voice recognition test, facial recognition test) of the driver 105 is received at the cash dispenser machine (e.g., after 404 in method 400). Viewing area 602 can display a CAC for the driver 105 to scan at the ATM 104 and can display various options on the driver user device 106 regarding the cash request the driver 105 is in the process of delivering. Verification response text 604 can display whether or not the identity of the driver 105 was authenticated by the provider computing system 102 for the cash delivery request. For example, after a picture of the driver 105 is taken by the camera 142 at the ATM 104 and the provider computing system 102 compares the generated image of the driver 105 with security information for the cash delivery request, the image of the driver 105 may successfully be authenticated and the driver 105 may receive another CAC and/or the cash may be dispensed. The driver user device 106 may receive QR code 606 from the provider computing system 102, along with instructions on how to use the CAC (e.g., "Scan at ATM", "Enter using keyboard of ATM", etc.). The user interface 600 shows a "view delivery route information" selection option 608, but in other arrangements, more or less selection options may also be presented for the online cash delivery application on driver user device 106. Upon selection of "view delivery route information" selection option 608, the online cash delivery application on driver user device 106 may navigate to a user interface showing a map of the overall delivery route and an indication of the driver user device 106's location with respect to the customer user device 108's location. In some arrangements, the map shows the current location of the driver user device 106, the location of the cash dispenser machine, and the location of the customer user device 108. In other examples, when a map is displayed after the "view delivery route information" selection option 608 is chosen via the driver user device 106, a user interface can display live traffic incidents and reports that may slow down progress on the delivery route to the location of the customer user device 108.

Referring to FIG. 6B, an example user interface 650 for the customer user device 108 is shown, according to an example arrangement. The user interface 650 may be displayed on the customer user device 108 when the location of the driver user device 106 is detected by the provider computing system 102 to be within a predetermined distance of the location of the customer user device 108 (e.g., when the driver user device 106 is within 20 feet of the customer user device 108, when the driver user device 106 is within a mile of the customer user device 108, and so on). In some arrangements, the user interface 650 is displayed during 312 of method 300 (FIG. 3) and 510 of method 500 (FIG. 5). User interface 650 can include viewing area 652, which shows "estimated time of arrival" information 654, QR code 656, and cash delivery selection options 658 and 660. In some arrangements, "estimated time of arrival" information 654 is an activatable link that navigates the online cash delivery application to a user interface showing the current location of the driver user device 106 on the calculated delivery route. QR code 656 may be the same QR code received by the driver user device 106 (e.g., QR code 606 of user interface 600) or a new QR code generated by the provider computing system 102 to send to the customer user device 108 for authentication at the "handshake" between the customer 107 and the driver 105. User interface 650 shows a "track delivery progress" selection option 658 and a "view driver 1179 profile" selection option 660. Upon selection of "track delivery progress" selection option 658, a new user interface may be navigated to on customer user device 108 showing a map of the calculated delivery route and the tracked location of the driver user device 106 (e.g., the location of the GPS data received from the driver user device 106). Upon selection of the "view driver 1179 profile" selection option 660, the customer user device 108 may display the current profile of the driver 105 completing the cash delivery request. In some arrangements, the driver profile displays the reviews from previous customers on the customer experience with the driver 105 and ratings of the driver 105 (e.g., each rating a customer 107 left after receiving a cash delivery request from the driver 105, an overall average rating of the driver 105, etc.).

Figure 7:
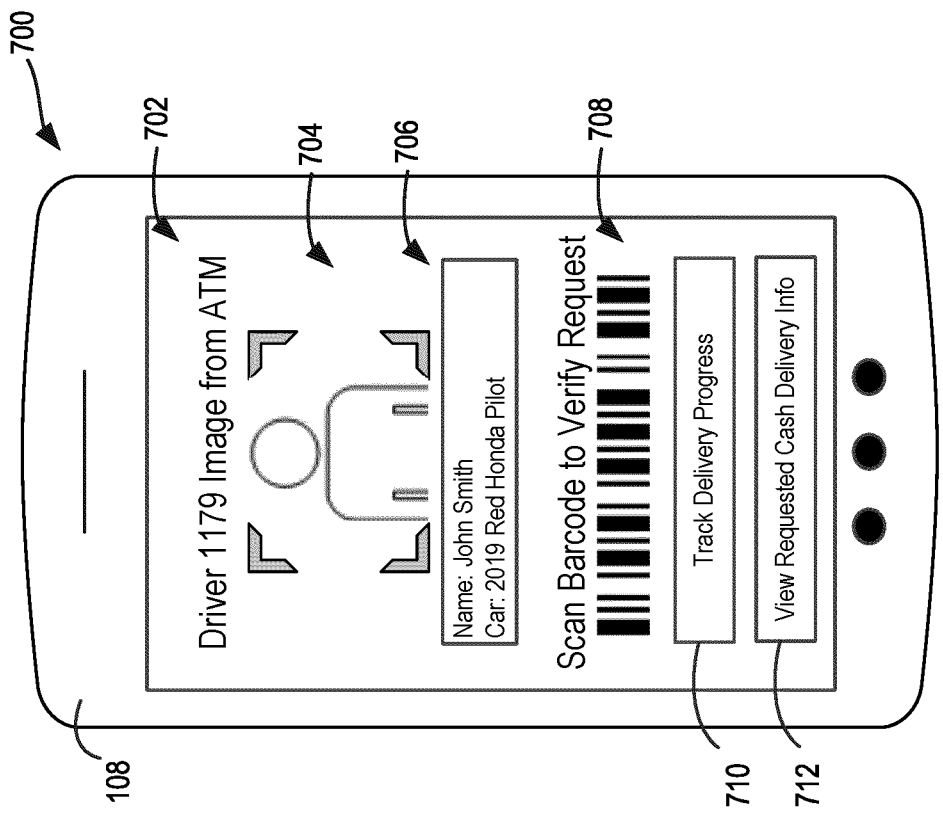
FIG. 7 is a schematic drawing depicting an example user interface of the customer user device used in the environment of FIG. 1, according to various arrangements.

Referring now to FIG. 7, an example user interface 700 for the customer user device 108 is shown, according to various arrangements. In some examples, user interface 700 is displayed on the customer user device 108 after the provider computing system 102 authenticates the driver 105 at the cash dispenser machine (e.g., the ATM 104). In other examples, the user interface 700 is not displayed on the customer user device 108 until the driver user device 106 is near the location of the customer user device 108. User interface 700 is shown to include a viewing area 702, driver image 704, driver information 706, barcode 708, and selection options 710-712. In some arrangements, the driver image 704 is the image generated by the camera 142 of the ATM 104. The driver image 704 may be compared to an image of the driver stored in the memory 116 of the provider computing system 102 before the provider computing system 102 generates the CAC for the customer user device 108 (e.g., barcode 708). Driver information 706 may include basic information on the driver 105 and the type of vehicle the driver 105 will arrive in (e.g., a 2019 red Honda Pilot) when delivering the cash. In other arrangements, the driver information 706 includes more features of the driver 105's profile, such as ratings and reviews. In some examples, the driver information 706 may also include contact information to dial the driver user device 106 or send a message to the driver user device 106. Barcode 708 may be scanned by the driver user device 106 to provide authentication with respect to the cash delivery request during the "handshake" of the driver 105 and the customer 107 (i.e., at the second authentication stage). In some arrangements, instead of barcode 708, a different type of CAC is used for authentication by the provider computing system 102. For example, instead of the barcode 708, an input box for entering a PIN or alphanumeric code is displayed on customer user device 108. User interface 700 is shown to include a "track delivery progress" selection option 710 and a "view requested cash delivery info" selection option 712. "Track delivery progress" selection option 710 may generate the same user interface as when "track delivery progress" selection option 658 (FIG. 6B) is chosen. Upon selection of "view requested cash delivery info" selection option 712, the customer user device 108 may navigate, via the online cash delivery application, to a user interface depicting the various details of the cash delivery request made. For example, the amount of cash requested, delivery preferences specified in the request, delivery instructions entered, information on the calculated delivery route and cash dispenser machine, and so on may be displayed via the customer user device 108 after "view requested cash delivery info" selection option 712 is selected.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method of providing authentication with respect to a cash delivery request made by a customer using a customer user device of the customer, comprising:
   receiving, by a provider computing system, security information and a first cash authentication code (CAC) from a cash dispenser machine, the cash dispenser machine obtaining the security information and the first CAC from a first user device of a driver, wherein the security information comprises a captured image of the driver by the first user device and at least one of a virtual identity card of the driver, a Personal Identification Number for the driver, or a biometric response of the driver;
   authenticating, by the provider computing system, the driver based on the security information and the first CAC;
   generating, by the provider computing system, a second CAC;
   authenticating, by the provider computing system, the driver and the customer based on at least one of the security information or the second CAC; and
   responsive to the authentication of the driver and the customer, indicating, by the provider computing system, that amount of cash identified by the cash delivery request has been exchanged from the driver to the customer.

2. The method of claim 1, wherein the second CAC used to authenticate the driver and the customer is the same as the first CAC used to authenticate the driver at the cash dispenser machine.

3. The method of claim 1, wherein the driver and the customer are authenticated by scanning the transmitted second CAC displayed on the first user device of the driver or the customer user device.

4. The method of claim 1, wherein the security information is compared to a user profile of the driver, the user profile of the driver comprising at least one of an image of the driver and at least one of the virtual identity card for the driver, the Personal Identification Number for the driver, or the biometric response of the driver stored by the provider computing system after the driver registers for a delivery service on an online cash delivery application.

5. The method of claim 4, further comprising sending security information of the cash delivery request to the customer user device, wherein the security information of the cash delivery request comprises the captured image of the driver taken at the cash dispenser machine for verification by the customer.

6. The method of claim 1, wherein the biometric response of the driver is verified by the provider computing system via an eye scan, a fingerprint scan, or a voice recognition test received from the cash dispenser machine.

7. The method of claim 1, wherein the first CAC is transmitted to the first user device of the driver in response to determining, via the provider computing system, that a GPS location of the first user device of the driver is within a predetermined distance of the cash dispenser machine.

8. The method of claim 1, the method comprising dispensing, by the cash dispenser machine, a sealed envelope with withdrawn cash for the cash delivery request inside, wherein the second CAC is printed on the sealed envelope.

9. A provider computing system of a provider institution comprising:
- a network interface circuit configured to communicate with a first user device of a customer, a second user device of a driver, and a cash dispenser machine, wherein the network interface circuit receives a cash delivery request made by the customer; and
- at least one processor operatively coupled to a non-transient memory to form a processing circuit, the at least one processor configured to:
  - receive at least one of security information and a first cash authentication code (CAC) from a cash dispenser machine, the cash dispenser machine obtaining the security information and the first CAC from a first user device of a driver or the driver, wherein the at least one of security information comprises at least one of a captured image of the driver by the first user device and at least one of a virtual identity card of the driver, a Personal Identification Number for the driver, or a biometric response of the driver;
  - authenticate the driver based on the security information and the first CAC;
  - generate a second CAC;
  - authenticate the driver and the customer based on at least one of the security information or the second CAC; and
  - responsive to the authentication of the driver and the customer, indicating that an amount of cash identified by the cash delivery request is provided to the customer.

10. The provider computing system of claim 9, wherein the second CAC used to authenticate the driver and the customer is the same as the first CAC used to authenticate the driver at the cash dispenser machine.

11. The provider computing system of claim 9, wherein the driver and the customer are authenticated by scanning the transmitted second CAC displayed on the second user device of the driver or the first user device of the customer.

12. The provider computing system of claim 9, wherein the security information is compared to a user profile of the driver, the user profile of the driver comprising at least one of an image of the driver and at least one of, the biometric response of the driver, the virtual identity card for the driver, the Personal Identification Number (PIN) for the driver, or the biometric response of the driver stored by the provider computing system after the driver registers for a delivery service on an online cash delivery application.

13. The provider computing system of claim 12, further comprising sending security information of the cash delivery request to the customer user device, wherein the security information of the cash delivery request comprises the captured image of the driver taken at the cash dispenser machine for verification by the customer.

14. A non-transitory computer-readable medium comprising computer-readable instructions such that, when executed by a processor, causes the processor to:
- receive security information and a first cash authentication code (CAC) from a cash dispenser machine, the cash dispenser machine obtaining the security information and the first CAC from a first user device of a driver, wherein the security information comprises a captured image of the driver by the first user device and at least one of a virtual identity card of the driver, a Personal Identification Number for the driver, or a biometric response of the driver;
- authenticate the driver based on the security information and the first CAC;
- generate a second CAC;
- authenticate, based on at least one of the security information or the second CAC, the driver and a customer who made a cash delivery request using a customer device of a customer; and
- responsive to the authentication of the driver and the customer, that an amount of cash identified by the cash delivery request is provided to the customer.

15. The non-transitory computer-readable medium of claim 14, wherein authenticating the driver further comprises facilitating a facial recognition process of the driver via a camera of the cash dispenser machine.

16. The non-transitory computer-readable medium of claim 14, wherein the second CAC used to authenticate the driver and the customer is the same as the first CAC used to authenticate the driver at the cash dispenser machine.

17. The non-transitory computer-readable medium of claim 14, wherein the driver and the customer are authenticated by scanning the transmitted second CAC displayed on the first user device of the driver or the customer device.

18. The non-transitory computer-readable medium of claim 14, wherein the computer-readable instructions further cause the processor to command the cash dispenser machine to dispense the amount of cash.

* * * * *